United States Patent
Lamm

[11] 3,807,367
[45] Apr. 30, 1974

[54] ROTARY PISTON INTERNAL COMBUSTION ENGINE OF TROCHOIDAL CONSTRUCTION

[75] Inventor: Heinz Lamm, Bernhardt, Germany

[73] Assignee: Daimler-Benz Aktiengesellschaft, Stuttgart-Unterturkheim, Germany

[22] Filed: Mar. 10, 1971

[21] Appl. No.: 122,882

[30] Foreign Application Priority Data
Mar. 16, 1970 Germany............................ 2012340

[52] U.S. Cl............ 123/8.09, 261/44 R, 123/119 R
[51] Int. Cl.............................................. F02m 7/12
[58] Field of Search................ 261/44 R, 53, 41 D; 123/8.09, 119 R

[56] References Cited
UNITED STATES PATENTS

| | | | |
|---|---|---|---|
| 1,231,886 | 7/1917 | Hendrix | 261/44 R |
| 1,412,137 | 4/1922 | Redmond | 261/44 R |
| 1,547,296 | 7/1925 | Bullard | 261/44 R |
| 1,807,423 | 5/1931 | Matson | 261/44 R |
| 1,813,206 | 7/1931 | Shipman | 261/44 R |
| 2,841,373 | 7/1958 | Broge | 261/44 R |
| 3,587,534 | 6/1971 | Weichelt | 123/119 R |
| 2,754,812 | 7/1956 | Gianini | 123/119 R |
| 3,575,388 | 4/1971 | Scarr, Jr. | 261/51 |
| 3,635,201 | 1/1972 | High | 261/51 |
| 3,642,256 | 2/1972 | Phelps | 261/51 |

FOREIGN PATENTS OR APPLICATIONS

| | | | |
|---|---|---|---|
| 2,726 | 11/1913 | Great Britain | 261/44 R |
| 205,411 | 10/1923 | Great Britain | 261/44 R |
| 710,099 | 5/1965 | Canada | 123/8.09 |

*Primary Examiner*—Tim R. Miles
*Attorney, Agent, or Firm*—Craig and Antonelli

[57] ABSTRACT

A rotary piston internal combustion engine of trochoidal construction with a throttle valve arranged in its inlet channel, with an injection nozzle for the injection of fuel transversely into the flow of the sucked-in combustion air and with a further throttle valve in the inlet channel located downstream of the injection nozzle.

11 Claims, 4 Drawing Figures

PATENTED APR 30 1974 3,807,367

INVENTOR
HEINZ LAMM

BY Craig, Antonelli, Stewart & Hill

ATTORNEYS

ROTARY PISTON INTERNAL COMBUSTION ENGINE OF TROCHOIDAL CONSTRUCTION

The present invention relates to a rotary piston internal combustion engine of trochoidal type of construction with a throttle valve arranged in the inlet channel and an injection nozzle provided for the injection of the fuel which injects fuel transversely across the flow of the sucked-in combustion air.

The heretofore customary suction pipe injection arrangement had, as a consequence, that the fuel, for example, at a small partial load, was injected within an area of slight turbulence formation and of low gas velocity. As a result thereof, the wall of the inlet channel was more strongly wetted with fuel and a fuel streak adhering at the wall resulted therefrom which reached only slowly and hesitatingly the trochoidal space under the suction effect without a wall detachment or mixing with the air taking place in such prior art arrangement. The fuel, which continued to remain wall-bound in the trochoidal space, caused a thinning of the oil film at the contact or running surfaces of the casing housing and at the sealing elements.

In order to counteract these disadvantages, the present invention is concerned with the task to provide a means in the inlet channel which prevents a wall wetting with fuel and which is capable to retain any fuel, not yet mixed with the air, in the channel center for such length of time until the fuel is prepared by the air.

The underlying problems are solved according to the present invention in that a further throttle valve is provided in the inlet channel, and in that the injection nozzle is arranged between the two throttle valves.

In an advantageous construction of the present invention, the bearing support of the throttle valve disposed upstream of the injection nozzle in relation to the flow direction may be arranged eccentrically in the inlet channel.

This arrangement offers the advantage that in the full load position, the lower halves of the throttle valves form with respect to one another a flow aperture or opening in the suction direction which enables a mixture formation also within the lower area of the inlet channel. In order not to keep too small the flow passage or opening provided for the eddying of the fuel-air mixture, according to a further feature of the present invention one throttle valve may be constructed offset with its upper and lower half starting from the point of rotation.

For streamlining reasons, it is proposed according to the present invention that the two throttle valves to be controlled in unison open in opposite directions.

According to the present invention in the full load position, the throttle valves may produce the smallest constriction in the inlet cross section and the lower halves of the throttle valves may be disposed partially one above the other with an appropriate gap width.

In an advantageous manner, the fuel jet discharged from the injection nozzle may impinge in the opened throttle valve position against the lower halves of the throttle valves in such a manner that preferably the throttle valve disposed closest to the trochoidal space absorbs the largest portion of the fuel.

In order to achieve an optimum turbulence between the two throttle valves and thus to realize a better mixture preparation, it is proposed as preferred embodiment according to the present invention to provide the throttle valve arranged downstream of the injection nozzle in the suction direction with spoiler or disrupter edges.

Accordingly, it is an object of the present invention to provide a rotary piston internal combustion engine of trochoidal construction which avoids by simple means the aforementioned shortcomings and drawbacks encountered in the prior art.

It is another object of the present invention to provide a rotary piston internal combustion engine of trochoidal construction with fuel injection in the inlet channel, which assures improved fuel preparation combined with improved operation of the engine.

A further object of the present invention resides in a rotary piston internal combustion engine of the type described above which not only prevents fuel streaks from adhering against the wall of the inlet channel, but also precludes the thinning of the oil film in the running surfaces of the housing casing and at the sealing elements as a result of fuel flow along the walls of the engine.

A still further object of the present invention resides in an internal combustion engine of trochoidal construction which assures highly effective turbulence of the combustion air within the area of the fuel injection under all operating conditions.

These and further objects, features, and advantages of the present invention will become more obvious from the following description when taken in connection with the accompanying drawing which shows, for purposes of illustration only, one embodiment in accordance with the present invention, and wherein.

Figure 1:
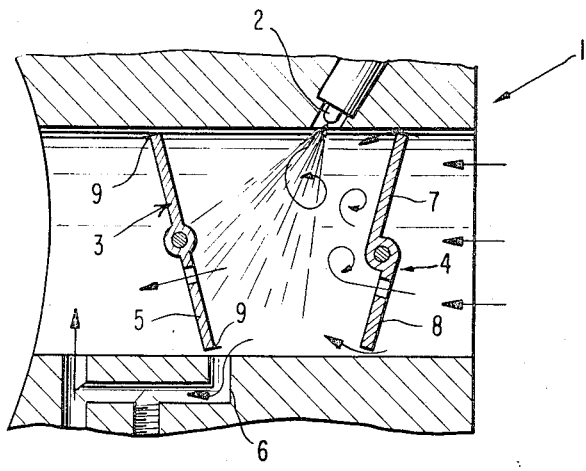
FIG. 1 is a partial longitudinal cross-sectional view of an inlet channel for a rotary piston internal combustion engine of trochoidal construction in accordance with the present invention in the idling position.

Referring now to the drawing wherein like reference numerals are used throughout the various views to designate like parts, and more particularly to FIG. 1, in this figure an injection nozzle 2 directed with its longitudinal axis approximately perpendicularly to the inlet channel generally designated by reference numeral 1 is arranged in this inlet channel 1 between two throttle valves 3 and 4 disposed one behind the other in the direction of flow. The throttle valve which is centrically supported between the trochoidal space and the injection nozzle 2 is generally designated by reference numeral 3, while the throttle valve which is eccentrically supported between the injection nozzle 2 and the inlet cross section of the inlet channel 1, is generally designated by reference numeral 4. The position of the injection nozzle 2 with respect to the throttle valves 3 and 4 is so arranged and constructed during the idling position that the principal portion of the fuel jet (about 75 percent) is directed against a lower half 5 of the throttle valve 3, possibly provided with one or several idling bores, and the remaining portion of the fuel directly wets the wall of the inlet channel within the area of the inlet aperture of an idling channel 6 disposed opposite the injection nozzle 2. The throttle valve 4, not hit by the fuel jet and eccentrically supported, is constructed vertically oval and is arranged offset with its upper half 7 and its lower half 8 starting from the axis of rotation. In the idling position (FIG. 1), the throttle valve 4 is not arranged gas-tight in the inlet channel, but it is either opened by a gap or it is provided with one or several flow-through bores for the gas flow. The air inflowing into the space between the two throttle valves 3 and 4 is sufficiently turbulent in both cases in order to achieve a good mixture formation with the injected fuel.

Figure 2:
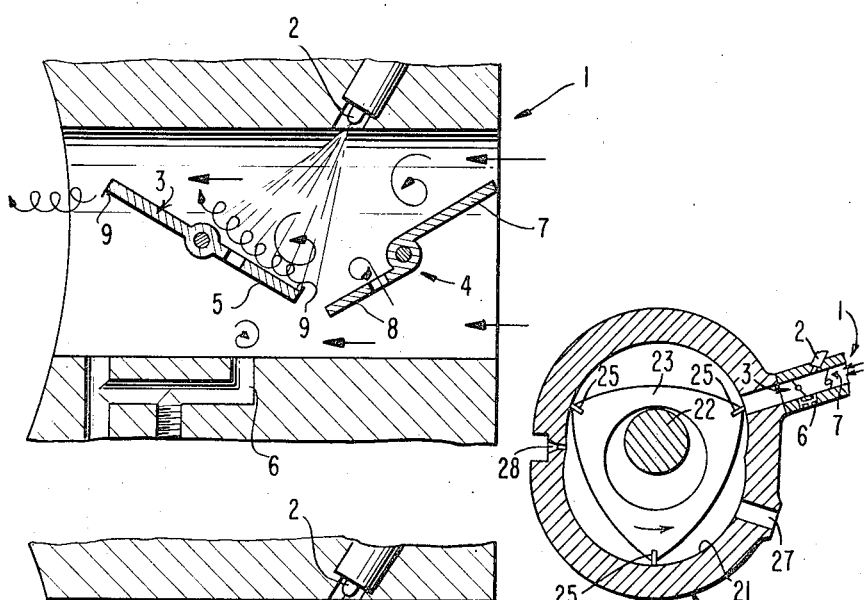
FIG. 2 is a partial longitudinal cross-sectional view similar to FIG. 1, illustrating the parts in a partial load position.

In the partial load position, the two throttle valves 3 and 4 to be controlled in unison are opened according to FIG. 2 in mutually opposite directions. The funnel-shaped space resulting therefrom between the throttle valves 3 and 4 produces a strong turbulence of the air flow together with the injected fuel whereby the turbulence formation is additionally and advantageously influenced by reason of the throttle valve 3 being provided with spoiler or disrupter edges 9. The fuel jet, which impinges nearly completely against the lower half 5 of the throttle valve 3 and only to a slight extent against the lower half 8 of the throttle valve 4, becomes with increasing opening of the throttle valves ever shorter in its jet length so that a rich mixture results in the upper channel half and a lean mixture in the lower channel half. Both channel flows mix again upstream of the inlet into the trochoidal space, i.e., at the end of the throttle valve 3. A good mixture preparation is thus assured.

Figure 3:
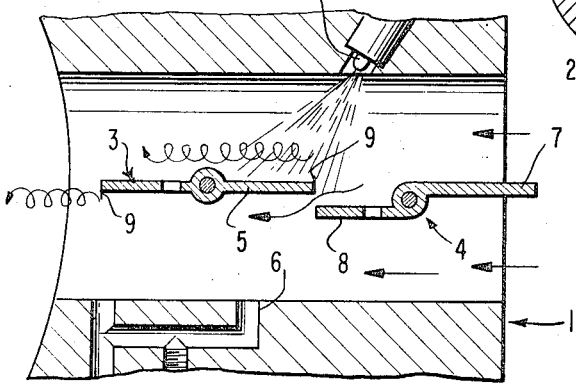
FIG. 3 is a partial longitudinal cross-sectional view, similar to FIGS. 1 and 2, illustrating the parts in the full-load position.

The arrangement of the throttle valves 3 and 4 in the full-load position is made according to FIG. 3 in such a manner that the lower halves 5 and 8 of the throttle valves, directed toward one another, form a gap width that exerts an influence on the mixture ration of the air- or mixture-flows necessary for the final mixture. Both throttle valves and the injection nozzle may possibly also be arranged either completely or partially in a separate part flangedly connected upstream of the inlet channel of the housing casing.

Figure 4:
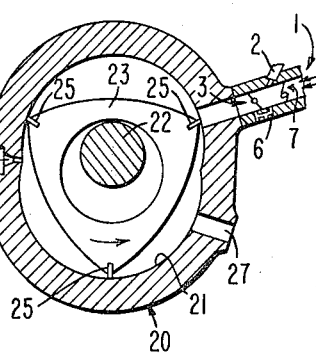
FIG. 4 is a schematic cross-sectional view through a rotary piston internal combustion engine of trochoidal construction to which the present invention applies.

In FIG. 4, reference numeral 20 generally designates the casing of the internal combustion engine of trochoidal construction, shown only schematically which is provided with a trochoidally shaped running surface 21. A piston 23 mounted for rotation on an eccentric shaft 22 slides with its piston corners provided with conventional sealing bars along the running surface 21. A firing device such as a spark plug is indicated schematically by reference numeral 28 while the exhaust port is designated by reference numeral 27. The inlet channel 1 is thereby connected with the casing in any suitable manner.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A rotary piston internal combustion engine of trochoidal construction, comprising inlet channel means, fuel injection means for injecting fuel into the inlet channel means approximately transversely to the flow of the sucked-in combustion air, a first and second throttle valve means disposed in said inlet channel means, said first and second throttle valve means being provided for producing sufficient turbulence within the area of the injected fuel, for achieving a good mixture preparation of the injected fuel under all operating conditions and for substantially preventing a wall wetting of the inlet channel means with fuel, said first and second throttle valve means being arranged one on each side of the injection means, wherein the throttle valve means located downstream of the injection means substantially closes the inlet channel means in the idling position, and an idling channel means provided in a wall portion forming the inlet channel means disposed substantially opposite the injection means, the lower half of said last-mentioned throttle valve means being provided with idling bore means for the passage of fuel, whereby the fuel injected from said injection means impinges with its principal portion against the lower half of said last-mentioned throttle valve means in the idling position while the remaining portion of the fuel is injected directly against the wall of the inlet channel means within the area of the inlet opening of said idling channel means.

2. A rotary piston internal combustion engine according to claim 1, wherein the throttle valve means disposed upstream of the injection means in the direction of flow within the inlet channel means is eccentrically mounted within said inlet channel means.

3. A rotary piston internal combustion engine according to claim 1, further comprising control means for controlling said throttle valve means substantially in unison and in mutually opposite directions of rotation with one of said valve means rotating clockwise while the other valve means rotates counterclockwise and vice versa.

4. A rotary piston internal combustion engine according to claim 1, wherein the fuel jet discharged from the injection means impinges in the fully opened throttle valve position against the lower halves of the throttle valve means in such a manner that the largest portion of the fuel jet is absorbed by the throttle valve means disposed nearest the trochoidal engine space.

5. A rotary piston internal combustion engine according to claim 1, wherein the throttle valve means disposed downstream of the injection means is provided with disrupter edge means.

6. A rotary piston internal combustion engine according to claim 1, wherein a bearing support of the throttle valve disposed upstream of the injection nozzle, as viewed in relation to the flow direction, is arranged eccentrically in the inlet channel.

7. A rotary piston internal combustion engine according to claim 6, wherein said throttle valve means disposed upstream of the injection nozzle is constructed offset with its upper and lower halves starting from its point of rotation.

8. A rotary piston internal combustion engine according to claim 7, further comprising means for controlling said two throttle valve means to control said valve means to open in unison in mutually opposite directions.

9. A rotary piston internal combustion engine according to claim 8, wherein in the full-load position the throttle valve means provide the smallest constriction in the inlet cross section and the lower halves of the throttle valves are disposed partially one above the other with predetermined gap width.

10. A rotary piston internal combustion engine according to claim 9, wherein said first throttle valve is the throttle valve disposed nearest the trochoidal space of the engine.

11. A rotary piston internal combustion engine according to claim 10, wherein the throttle valve arranged downstream of the injection nozzle, as viewed in the suction direction, is provided with disrupter edge means.

* * * * *